United States Patent [19]

Meadows

[11] 3,772,806
[45] Nov. 20, 1973

[54] OYSTER TONGS
[76] Inventor: J. Thomas Meadows, 74 Bowman Dr., Salisbury, Md. 21801
[22] Filed: Mar. 16, 1972
[21] Appl. No.: 235,226

[52] U.S. Cl............................ 37/119, 37/55, 37/71, 37/187, 251/295
[51] Int. Cl.............................................. E02f 5/00
[58] Field of Search ................ 37/55, 71, 119, 183, 37/187, 188; 251/295

[56] References Cited
UNITED STATES PATENTS

| 3,608,217 | 9/1971 | Voisin, Sr. ........................ 37/119 X |
| 3,523,614 | 8/1970 | Walker .............................. 37/71 X |
| 3,648,968 | 3/1972 | Reid et al. ..................... 251/295 X |
| 1,604,284 | 10/1926 | Harrington.................... 37/183 R X |
| 3,641,689 | 2/1972 | Billings ............................. 37/187 X |
| 2,621,428 | 12/1952 | Billings ............................... 37/187 |
| 3,513,572 | 5/1970 | Noret................................ 37/187 X |

FOREIGN PATENTS OR APPLICATIONS

| 680,759 | 10/1952 | Great Britain........................ 37/188 |
| 2,171 | 8/1866 | Great Britain........................ 37/55 |

Primary Examiner—Robert E. Pulfrey
Assistant Examiner—Clifford D. Crowder
Attorney—Francis C. Browne et al.

[57] ABSTRACT

Tongs for harvesting oysters including two grated baskets pivoted to a support frame in opposed relation for actuation between open and closed positions by a hydraulic motor mounted on the support frame to directly drive one basket which in turn is connected to the other basket by a linkage for driving the latter in unison. The tongs are raised and lowered in water from a boat by a cable driven by a hydraulically operated switch. Operation and control of the tongs and the winch is achieved through a hydraulic system including foot pedals which actuate control valves for supplying and exhausting hydraulic fluid to and from the motors associated with the tongs and the winch.

7 Claims, 6 Drawing Figures

PATENTED NOV 20 1973

OYSTER TONGS

OBJECTS OF INVENTION

The present invention generally relates to harvesting oysters from a boat or watercraft, and more specifically, to a system for harvesting oysters including a novel tong mechanism for harvesting the oysters from their bed below water.

One of the objects of the present invention is to provide an improved system for harvesting oysters from a watercraft in a relatively simple but highly efficient manner requiring few personnel and little or no manual effort. Included herein is the provision of such a system which may be employed to increase the yield of harvested oysters without increasing labor cost.

A further object of the present invention is to provide a novel tong mechanism incorporated in said system for picking up oysters from an oyster bed and for holding the same until deposited on the watercraft above water. Included herein is the provision of such a tong mechanism which has a highly compact and durable construction facilitating handling during operation as well as storage on a boat when not in use.

A still further object of the present invention is to provide such a tong mechanism which will achieve the above objects without sacrificing its oyster handling capacity and capability.

SUMMARY OF INVENTION

The above and other objects are achieved in an oyster harvesting system including an oyster tong mechanism having opposed baskets mounted on a frame for pivotal movement between open position for harvesting oysters from an oyster bed and a closed position for holding harvested oysters until deposit such as on a boat. The oyster tong mechanism is raised and lowered in water from a boat by means of a cable mounted on a boom and pulley unit supported on a boat. The cable is actuated for lowering and raising the oyster tong mechanisms in the water by means of a winch mounted on the boat. The winch and tong mechanism are actuated by hydraulic motors respectively associated therewith and under the control of a hydraulic system which is operated by a plurality of foot pedals mounted at a convenient station on the boat to enable a single operator to harvest oysters while having his hands free for other work during the harvesting operation.

In one preferred embodiment, the baskets of the tong mechanism each have a grate construction including a plurality of elongated rods extending in the longitudinal direction of the basket and being arranged to form an enclosure when the baskets are in closed opposed position relative to each other. A plurality of ribs extend transversely across the elongated basket rods, there being a main central rib in each basket employed for transmitting motion to the baskets for actuating the same. Each of the baskets has a plurality of diagonal struts diagonally intersecting sections of the baskets on opposite sides of the main or central rib to provide added reinforcement to the baskets. The lower longitudinal edge portions of the baskets are provided with plurality of projecting fingers for facilitating initial pickup of the oysters. Additionally, adjacent fingers on the baskets mesh or overlap with each other when the baskets are in closed position to, in effect, close the bottom of the baskets to prevent oysters from escaping from the bottom of the baskets.

Actuation of the baskets is achieved in the preferred embodiment by a hydraulic or other fluid operated motor having a reciprocable drive rod connected to the main or central rib of one of the baskets to pivot the same between open and closed positions upon retraction and extension of the drive rod. The other basket is pivoted in unison with said one basket by means of a linkage mechanism including a straight link interconnecting the baskets for transmitting motion from said one basket to the other basket. The tong motor, including its drive rod, is mounted in close parallel relationship to the frame which mounts the baskets, thereby lowering the overall center of gravity of the tong mechanism to facilitate handling while in use as well as to provide a more compact apparatus for storage. The linkage mechanism is also mounted parallel and close to the opposite sides of the basket support frame, thereby further enhancing the compact construction of the mechanism, The tong mechanism is attached to the pulley cable by means of an eye mounted on a pair of vertical straps secured to the basket support frame in straddling relationship to the motor to further secure the motor in the desired parallel position relative to the basket support frame. The motor is further secured to the frame by a bracket projecting from its rear end and suitably connected to the basket support frame.

DRAWINGS

Other objects and advantages will become apparent from the following more detailed description taken in conjunction with the attached drawings in which.

DETAILED DESCRIPTION

Figure 1:
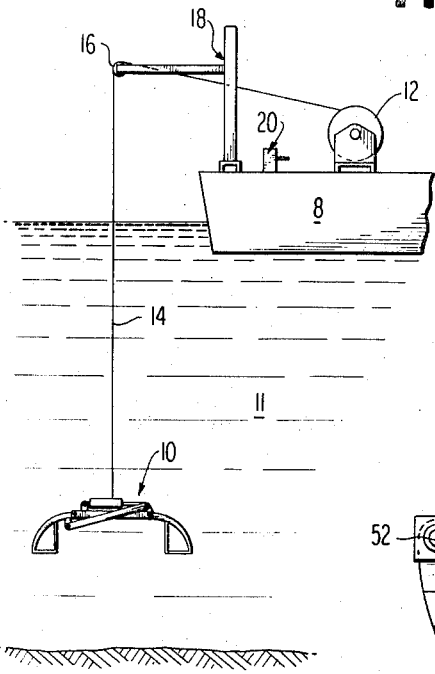
FIG. 1 is a schematic view of a system including apparatus for harvesting oysters in accordance with the present invention.

Referring now to the drawings in detail, FIG. 1 shows for illustrative purposes only a system for harvesting oysters in accordance with the present invention from a water craft or boat 8 utilizing oyster tongs 10 raised and lowered in the water 11 by means of a power-driven winch 12 connected to the tongs 10 by a cable 14; the latter being received over a pulley 16 mounted on a boom and mast unit 18. As will be described in greater detail, the tongs 10 and winch 12 are hydraulically driven by associated motors controlled by foot pedals located on the boat at station 20 shown in FIG. 1.

Figure 2:
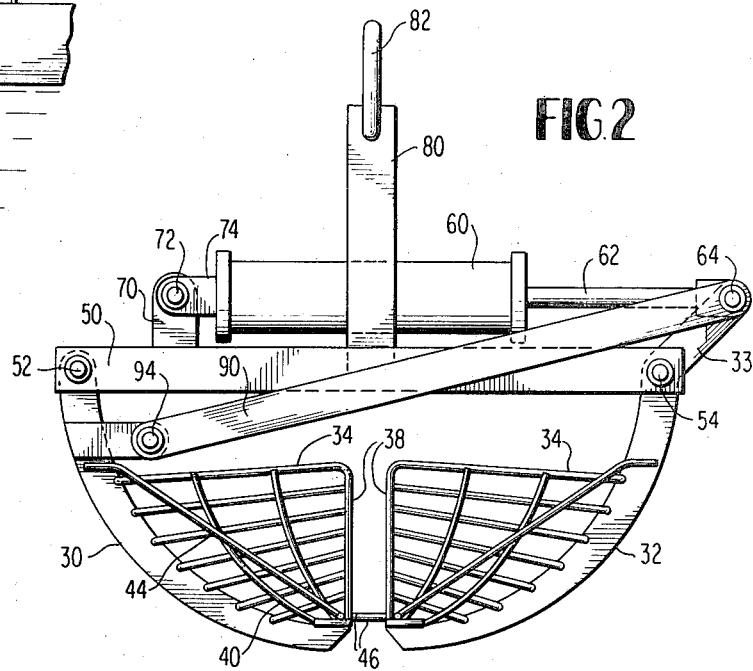
FIG. 2 is an end elevational view of oyster tongs included in the system of FIG. 1 shown in a closed position.
Figure 3:
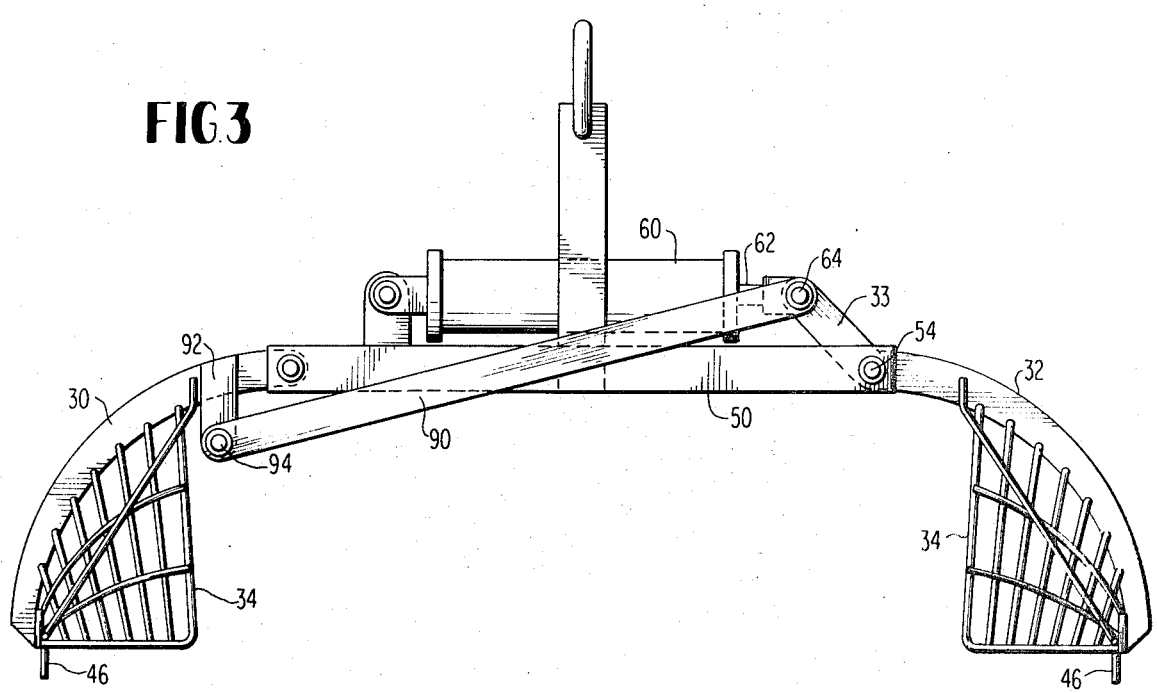
FIG. 3 is a view similar to FIG. 2 but showing the oyster tongs in a fully open position.
Figure 4:
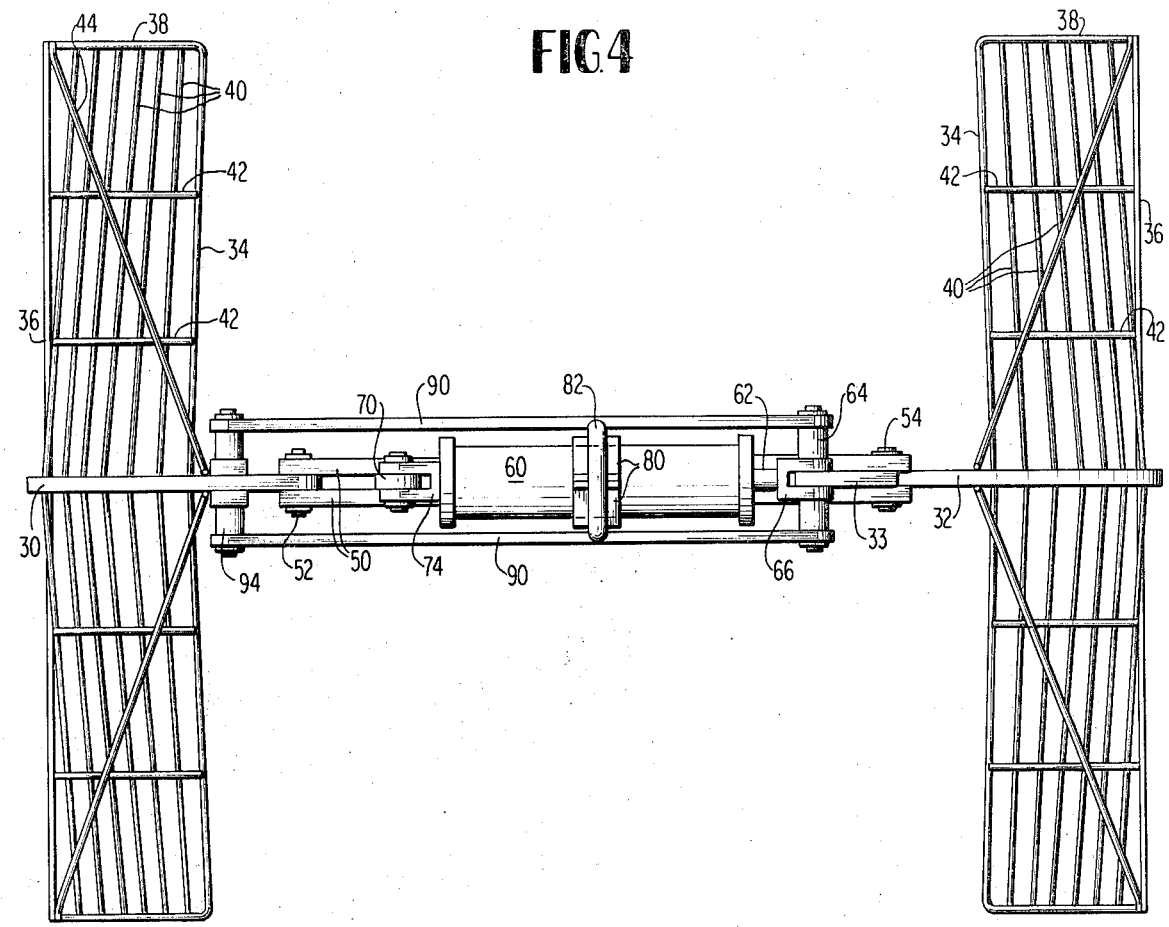
FIG. 4 is a plan view of the oyster tongs when in fully open position.

Referring to FIGS. 2 and 4, tongs 10 include opposed baskets having a grate construction including arcuate convex central ribs 30 and 32 with outer frame members 34 and 36 projecting laterally outwardly from opposite sides of the ribs and being interconnected by end frame members 38. Within the outer frame members of the baskets, elongated rods 40 extend from central ribs 30 and 32 to the end frame members 38. The baskets are reinforced by transverse ribs 42 extending to and between frame members 34 and 36 while transversely crossing and being fixed to the inner rods 40 as shown in FIG. 4. Additional reinforcement is provided by diagonal struts 44 which, in the specific embodiment, are fixed between the main central ribs 32 and 30 and the corner of the baskets at the juncture between frame members 38 and 36. The basket members are made from a suitable material such as steel rods which may be coated with any suitable weather and water resistant material if desired. As will be seen from FIGS. 2 and 5, the baskets are shaped so that when in fully closed position they will define an enclosure for holding oysters which have been harvested by moving the baskets along an oyster bed from an open position shown in FIGS. 3 and 4 to closed position shown in FIGS. 2 and 5.

Figure 5:
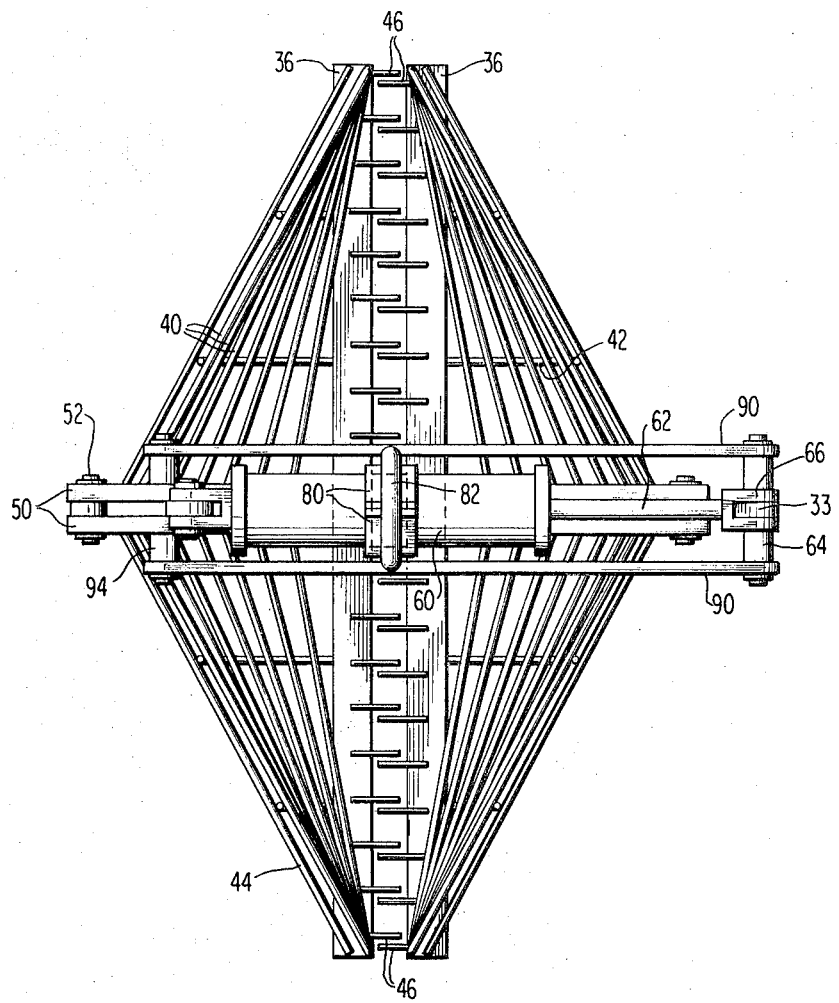
FIG. 5 is a plan view of the tongs when in fully closed position.

To facilitate initial pickup of the oysters, each basket is provided with a plurality of fingers 46 projecting outwardly from the lower frame edge 36 as shown in FIG. 5. Fingers 46 on the baskets are in side-by-side overlapping relationship so as to also provide a barrier between the baskets when in fully closed position, preventing escape of oysters from the lower edges of the baskets.

For purposes of support and actuation, the baskets are pivotally mounted to a frame, which in the shown embodiment includes a pair of rigid bars 50 situated in side-by-side parallel relationship, with the main ribs 30 and 32 of the baskets mounted between the bars 50 on pivot pins 52 and 54 received in said bars 50. Actuation of the baskets is achieved through a motor, preferably a hydraulic or other fluid motor 60, mounted in close overlying parallel relationship to bars 50 as shown in FIGS. 2 and 3. Motor 60 has a reciprocable drive rod 62 with a clevis 66 on its outer end receiving a pivot pin 64 which passes through an ear 33 rigidly projecting upwardly from central rib 32 of one of the baskets at an obtuse angle relative thereto. It will be seen that extension of drive rod 62 will cause rib 32 and the associated basket to pivot clockwise (as viewed in FIG. 3) about pivot pin 54 to move the associated basket into closed position shown in FIG. 2, it being understood that ear 33 is a rigid extension of rib 32 and moves together with rib 32. Retraction of drive rod 62 will, of course, have the opposite effect to cause the basket to pivot counterclockwise about pivot pin 54 to open position shown in FIG. 3.

Movement of the other basket (which includes rib 30) simultaneously with basket 32 is achieved through an improved linkage mechanism which, in the shown embodiment, includes a pair of straight links 90 located on opposite sides of support frame bars 50 with their upper ends pivotally mounted on pivot pin 64 which connects ear 33 to drive rod 62 of the motor. The lower ends of links 90 are pivotally connected to a pivot pin 94 which is mounted in a lug 92 fixed to rib 30 and projecting inwardly from an upper portion thereof.

Motor 60 is secured to support frame bars 50 by means of a bifurcated bracket 74 fixed to and projecting rearwardly from the end of the motor and receiving an upstanding lug 70 fixed to bars 50. Bracket 74 and lug 70 are connected by a pin 72. Motor 60 is additionally secured to frame bars 50 by means of vertical straps 80 secured to bars 50 in straddling and restraining relationship with respect to the opposite sides of motor 60 to insure that motor 60 and its drive rod 62 remain parallel to bar 50. A ring or eye 82 is fastened to the top of straps 84 for connecting pulley cable 14 to the tong mechanism.

Figure 6:
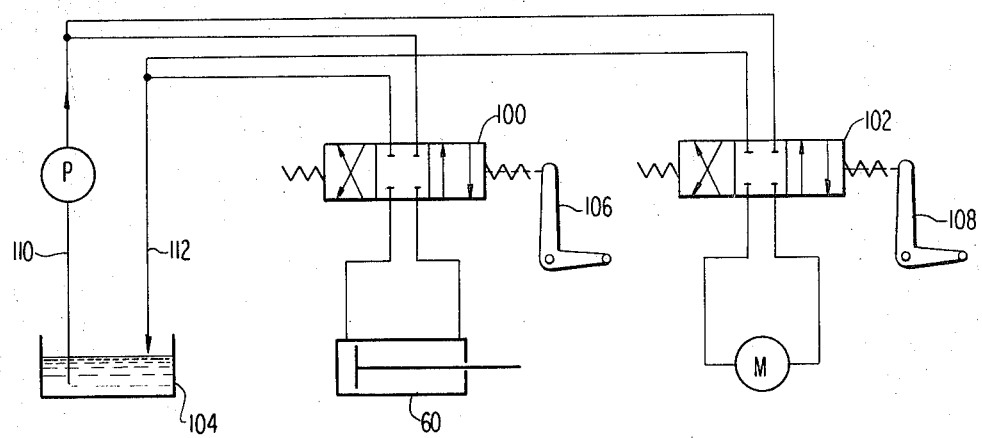
FIG. 6 is a schematic view of a hydraulic control system for operating the apparatus in the system of FIG. 1.

Referring now to FIG. 6, motor 60 and winch motor M are supplied and exhausted with hydraulic or other motive fluid from a source 104 under the control of two conventional four-way valves 100 and 102, which are actuated by foot pedals 106 and 108 respectively located at station 20 on the boat, as indicated in FIG. 1. In the preferred embodiment, each foot pedal 106 and 108 has three positions. For example, foot pedal 106 controlling the tong mechanism motor 60 may be pivoted clockwise or counterclockwise to open or close the tongs as desired whereas a position intermediate the latter positions would be employed to hold the tongs in either position. The same concept is applied with respect to foot pedal 108, whereby pivoting it in one direction would rotate the winch in one direction and pivoting the foot pedal 108 in the opposite direction would rotate the winch in the opposite direction. An intermediate position would hold the winch in position. Motive fluid is supplied to control valves 100 and 102 through a supply line 110 containing a suitable pump while motive fluid is returned to the source 104 through a return line 112. Any other suitable hydraulic system may be employed. However, it is highly preferred that it be operated through a means of foot pedals which would free the operator's hands for other activity during the oyster harvesting operation.

I claim:

1. Tong mechanism for harvesting oysters or the like comprising in combination, a mounting frame, a pair of opposed baskets pivoted to said frame for movement between open positions spaced apart from each other and closed positions forming an enclosure for holding oysters, a motor mounted to said support frame and having an output means operatively connected to one of said baskets to pivot the same between said open and closed positions thereof, and linkage means interconnecting said baskets for transmitting movement of said one basket to the other basket for opening and closing the other basket simultaneously and in unison with said one basket, said baskets each having a grate construction including a generally convex central rib extending transversely of the basket at the central portion thereof below said frame, a plurality of elongated rods fixed to and projecting from opposite sides of the central rib and extending to the opposite ends of the basket in spaced relationship to each other so as to converge toward the opposite ends of the basket when the baskets are in closed position, and a number of intermediate ribs positioned between the central rib and the ends of the basket and extending transversely of the baskets and being fixed to said rods.

2. The tong mechanism defined in claim 1 wherein said one basket has an ear fixed thereto and projecting upwardly therefrom above the frame and wherein said output means of the motor is connected to said ear to pivot said one basket between open and closed positions thereof, and wherein said linkage means includes a link having one end portion thereof pivotally connected with respect to said ear and having an opposite end portion thereof pivotally connected with respect to the other basket to actuate the other basket between open and closed positions in unison with said one basket.

3. The tong mechanism defined in claim 2 wherein said frame includes a pair of generally parallel bars extending in spaced side-by-side relationship including pivot pins extending and being mounted therebetween, said baskets extending transversely relative to the direction of said bars and being mounted on said pivot pins, the pivot pins being located at opposite end portio s of said bars, said link being located adjacent to but outwardly of one of said bars.

4. The tong mechanism defined in claim 2 further including strap means secured to said mounting frame on opposite sides of said motor for securing said motor relative to said frame, and an eye connected to said strap means for receiving a cable for connecting the tong mechanism to the cable for raising and lowering the tong mechanism in the water.

5. The tong mechanism defined in claim 1 wherein the lower longitudinal edge portions of said baskets face vertically downwardly when the baskets are in fully open position and wherein said lower edges face each other in generally parallel position when the baskets are in fully closed position.

6. The tong mechanism defined in claim 5 further including a plurality of fingers projecting from said lower edges of said baskets at locations spaced longitudinally along said lower edge portions of said baskets such that when the baskets are in fully closed position, fingers on the baskets will be in overlapping relationship.

7. Tong mechanism for harvesting oysters or the like comprising in combination, a mounting frame, a pair of opposed baskets pivoted to said frame for movement between open positions spaced apart from each other and closed positions forming an enclosure for holding oysters, means including a motor mounted on said support frame and operatively connected to said baskets to pivot the same between said open and closed position thereof in unison, said baskets each having a grate construction including a generally convex central rib extending transversely of the basket at the central portion thereof below said frame, a plurality of elongated rods fixed to and projecting from opposite sides of the central rib and extending to the opposite ends of the basket in spaced relationship to each other so as to converge toward the opposite ends of the basket when the baskets are in closed position, and a number of intermediate ribs positioned between the central rib and the ends of the baskets and extending transversely of the baskets and being fixed to said rods.

* * * * *